United States Patent [19]
Fennel et al.

[11] Patent Number: 4,648,662
[45] Date of Patent: Mar. 10, 1987

[54] CIRCUIT CONFIGURATION FOR A SLIP-CONTROLLED VEHICLE BRAKE SYSTEM

[75] Inventors: Helmut Fennel, Bad Soden; Hans Wupper, Friedrichsdorf, both of Fed. Rep. of Germany

[73] Assignee: Alfred Teves GmbH, Frankfurt, Fed. Rep. of Germany

[21] Appl. No.: 732,342

[22] Filed: May 8, 1985

[30] Foreign Application Priority Data

May 9, 1984 [DE] Fed. Rep. of Germany ....... 3417019

[51] Int. Cl.4 .............................................. B60T 8/02
[52] U.S. Cl. ........................................ 303/92; 303/96
[58] Field of Search ................. 303/92, 100, 119, 103, 303/96, 110, 111; 340/52 B, 62; 364/42 C

[56] References Cited

U.S. PATENT DOCUMENTS

| 3,930,687 | 1/1976 | Amano | 303/92 |
| 4,059,312 | 11/1977 | Jonner | 303/92 |
| 4,098,542 | 7/1978 | Rajput et al. | 303/92 |
| 4,143,926 | 3/1979 | Miller | 303/92 |
| 4,270,808 | 6/1981 | Brearley | 303/92 |
| 4,345,796 | 8/1982 | Reinecke | 303/92 |

FOREIGN PATENT DOCUMENTS

| 2209745 | 9/1972 | Fed. Rep. of Germany . |
| 2411173 | 9/1974 | Fed. Rep. of Germany ........ 303/92 |
| 1409032 | 10/1975 | United Kingdom . |

Primary Examiner—Duane A. Reger
Assistant Examiner—Alvin Oberley
Attorney, Agent, or Firm—James B. Raden; William J. Michals

[57] ABSTRACT

A circuit configuration for a slip-controlled vehicle brake system is equipped with sensors (10-13) for the determination of the rotational behavior of the front and the rear wheels and with electronic circuits (18, 30) for the processing, logic combining and monitoring of the sensor signals and for the generation of control signals. The control signals allow control of the braking pressure variation at the wheels. Upon failure or malfunction of a sensor (10-13) or in the event of an interference in the signal path, the brake slip control is switched over to being responsive to the rotational behavior of another wheel according to a predetermined selection criterion.

3 Claims, 1 Drawing Figure

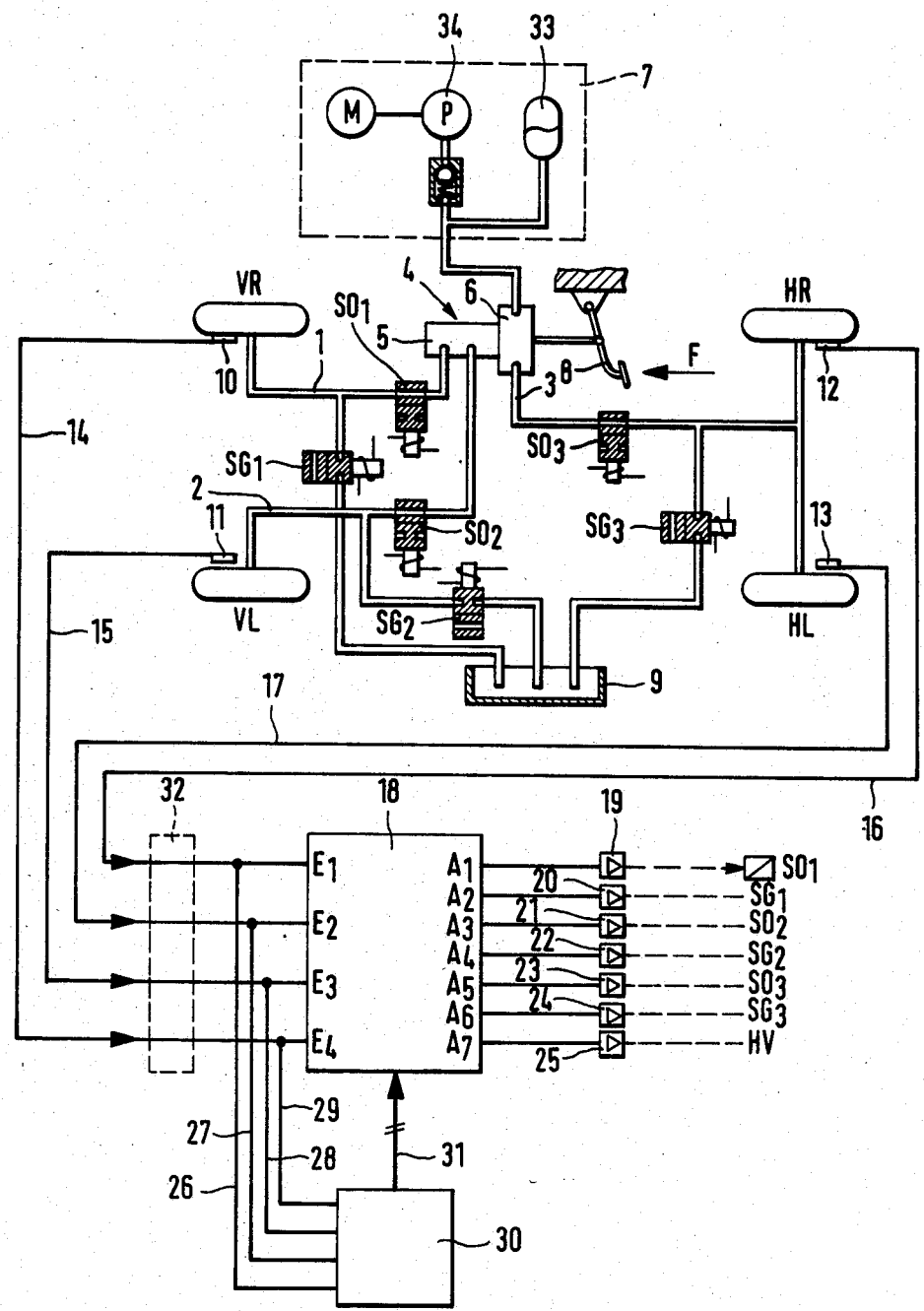

CIRCUIT CONFIGURATION FOR A SLIP-CONTROLLED VEHICLE BRAKE SYSTEM

BACKGROUND OF THE INVENTION

The present invention relates to a circuit configuration for a slip-controlled vehicle brake system which is equipped with sensors for the determination of the rotational behavior of the front and the rear wheels including electronic circuits for the processing, logic combining and monitoring of the sensor signals. The invention provides for the generation of control signals which allow control of the braking pressure variation individually at single wheels and/or simultaneously at several wheels according to predetermined selection criteria.

A known circuit configuration of this type (German printed and published patent application No. 22 09 745) comprises circuitry for monitoring the wheel sensors which serves to de-activate the entire brake slip control upon the occurrence of a sensor error. If this happens during a braking action or if the driver does not recognize such sensor malfunction in time, a dangerous situation may result from the de-activation of the brake slip control.

It is also known to monitor the pressure of the auxiliary energy source in an anti-locking vehicle brake system and to de-activate the brake slip control in the event of pressure decrease which occurs not instantaneously, but upon termination of the existing control signal by means of a bridging circuit (German patent specification No. 24 11 173). This system recognizes that in a defective auxiliary circuit the residual pressure frequently is still sufficient to complete the prevailing braking action with control. Such considerations are not applicable to the monitoring of sensors because the malfunctions thereof are of immediate consequence.

Previously, it has been considered necessary to de-activate the slip control at once or with delay in the event of sensor failure or sensor malfunction in order to reliably preclude braking pressure decrease as a consequence of interference signals and in order to ensure at least braking of the vehicle without slip control even in an interference. To this end, it should be recognized that a faulty sensor might fake wheel lock and thus provoke dangerous braking pressure decrease. The disadvantages and serious consequences of an unexpected de-activation of brake slip control, for instance during braking with slip control on icy roads, have been a problem in these prior art systems.

Hence, it is an object of the present invention to overcome the disadvantages of the prior art slip-controlled vehicle brake systems and to provide a slip-controlled brake system which completes the braking action without endangering driving stability. The present invention is directed to optimum short stopping distance even upon the occurrence of a sensor error of short or longer duration or a defect in the path of transmitting and processing of the sensor signal such as, for example, in the event of cable fraction, cable shortcircuit, a defective trigger or the like. That is, instantaneous de-activation of the control should be avoided because of the described dangerous consequences for driving stability and without significantly reducing the braking effect.

SUMMARY OF THE INVENTION

This object is achieved in a vehicle brake system of the type described and including the improvement that upon failure or interference of the sensor signals of one or more of the wheels, the braking pressure control of these wheels is switched over to being responsive to the rotational behavior of another wheel according to a predetermined selection criterion.

According to a particularly advantageous embodiment of this invention, failure or interference of the sensor signals of one front wheel causes the braking pressure control of this wheel to switch over and be responsive to the second front wheel, while upon failure or interference of the sensor signals of a rear wheel the braking pressure control of this wheel will switch over and become responsive to the rotational behavior of the front wheel on the same side.

Hence the vehicle brake system enables brake slip control to continue even upon the occurrence of a sensor error or a sensor signal error in unfavorable driving situations, for example during braking with slip control. As a result, driving stability and steerability of the vehicle are maintained, without allowing neutralization of the braking effect to take place in consequence of the sensor error. In comparison to braking with the aid of intact sensors, or an intact control, a somewhat longer stopping distance may be experienced.

BRIEF DESCRIPTION OF THE DRAWING

Further features, advantages and applications of the present invention will be explained in the following description of the embodiment of this invention by way of the accompanying drawing in which the single FIGURE provides in a schematically simplified fashion, the hydraulic and electric wiring diagram of a slip-controlled brake system for automotive vehicles.

DETAILED DESCRIPTION

Referring now to the drawing, the front wheels of an automotive vehicle are designated by VR, VL, while the rear wheels are referred to as HR and HL. In this arrangement, a hydraulic brake system with three hydraulically isolated brake circuits 1, 2 and 3 are utilized. Serving as a braking pressure generator 4 is a unit composed of a tandem master cylinder 5 and a hydraulic booster 6 to which the brake circuit 3 is directly connected. An auxiliary pressure source consisting of a hydraulic accumulator 33 and a pressure fluid pump 34 driven by an electric motor is generally shown at reference numeral 7. The brake force F applied by way of a pedal 8 on the braking pressure generator 4 is transmitted onto the master cylinder 5 boosted by the auxiliary force.

Inserted into the hydraulic conduit from the braking pressure generator 4 to the wheel are electromagnetically actuatable multi-directional control valves which are open in their de-energized state and are referred to as SO, namely $SO_1$, $SO_2$ and $SO_3$. As soon as a signal is applied to these SO-valves, the latter will change over and close the passage of hydraulic medium. Further, the three hydraulic circuits 1, 2, 3 are in communication with a pressure supply reservoir 9 by way of (SG) valves $SG_1$, $SG_2$ and $SG_3$ which are closed in their de-energized state, with a view to bringing about pressure decrease by virtue of energization of these latter valves and by closing the assigned SO-valves as a counteraction to be taken upon the occurrence of an imminent locked condition.

Each individual wheel VR, VL, HR, HL is herein equipped with an inductive sensor 10, 11, 12, 13, into the probe of which a voltage will be induced, the frequency of said being proportional to the wheel speed.

The wheel sensors are connected to an electronic curcuit 18 by way of signal lines 14 to 17 in which the sensor signals are logically combined and processed. As a result of this signal processing, control signals will be furnished at the output of the circuit 18 which are amplified by means of switching amplifiers 19 to 25 and which are passed on to the electromagnetically actuatable SO-valves and SG-valves by way of the illustrated dotted lines. At the output of the amplifier 25, there is connected a non-illustrated main valve HV which serves to establish a direct or indirect connection between the auxiliary energy source 7 and the master cylinder brake circuits 1, 2 in order to maintain a sufficient quantity of pressure fluid in these circuits, even if pressure fluid is discharged by way of the $SG_1$-, $SG_2$-valves to the supply reservoir 9 for the purpose of braking pressure decrease.

Furthermore, circuit configuration in accordance with the present invention comprises a monitoring circuit 30 communicating whereto are the sensors 10 to 13 and, respectively, the sensor signal lines 14 to 17 by way of the signal lines 26, 27, 28 and 29. By way of signal lines 31 designed as a multiple line herein, the result of the sensor monitoring is fed to the logic circuit or, respectively, to the electronic circuit 18.

A component 32 in dotted lines illustrates symbolically that the monitoring circuit allows to be inserted at different places in the path of the sensor signals, for instance not prior than in the connection to the signal processing in component 32, thus enabling the monitoring circuit 30 to recognize not only sensor errors, but also interferences in the signal paths connected downstream thereof.

As long as the monitored sensors, signal paths and signal-processing stages are intact, the wheel rotational behavior of each wheel will be taken into account individually when logically combining the sensor signals, when determining the vehicle reference speed and, finally, when generating the control signals at the outputs $A_1$ to $A_7$ of the circuit 18. When, however, the monitoring circuit 30 recognizes a sensor failure or sensor error, there will take place switching-over or, respectively, change of the logic combining, with the result that now the output signals of the electronic circuit 18 and thus the braking pressure variation will be determined by the intact sensor signals, the said switching-over being performed according to predetermined selection criteria which ensure that brake slip control can be continued despite a defective sensor or sensor signal generator without endangering driving stability and without the imminent risk of a too great braking pressure decrease. Upon completion of the braking action—provided the error is not of an only temporary nature—brake slip control will then be de-activated and the existence of an error will be signaled.

In a preferred embodiment of the circuit configuration of the present invention, the monitoring circuit 30 recognizes a sensor error at a front wheel VR, VL, the corresponding inlet of the circuit 18 will be closed, whereby it will be prevented that the defective sensor influences the control and whereby the control of this front wheel switches over to being responsive to the second front wheel. As a result, there will be concurrent control of both front wheels VR, VL in response to the wheel rotational behavior of the front wheel allocated to the intact sensor. In the worst case, the braking pressure in the wheel cylinder of the wheel disposing of the defective sensor may become too high so that this wheel will lock. However, owing to the second front wheel determining the magnitude of braking pressure in this stage, there will be maintained a lateral guidance force at the front axle and thus steerability of the vehicle in this situation, though only to a limited extent under certain circumstances.

To increase the lateral guidance force for the purpose of improvement of steerability, it is likewise possible to slightly reduce the maximum braking pressure at the front axle in the case of malfunction.

When a sensor error occurs at a rear wheel HR, HL, however, the rear wheel with the defective sensor will be switched over to the control channel of the front wheel on the same side by means of the monitoring circuit 30 and/or the circuit 18. That means that now the inlet $E_1$ or, respectively, $E_2$ will be closed electronically and that, instead of the error signal, the information about the rotational behavior of the front wheel on the same side will be logically combined with the signals of the other wheels. When there is correct brake balance and provision of a select-low circuit at the rear axle, which is expedient and conventional at least in three-circuit control circuitries of the type illustrated and described, the braking pressure at the rear axle will now be determined by the wheel rotational behavior of the front wheel which is disposed on the same side as the rear wheel with the defective sensor. In consequence thereof, too low braking forces are available at the rear axle, what can be tolerated, however, since this causes a particularly high driving stability and a stopping distance which is at most slightly longer.

In the event of undue brake balance, the rear wheel with the sensor error may lock under unfavorable conditions in the case of interference described last. However, owing to the select-low circuit of the rear axle, it will be ensured likewise in this situation that at least the rear wheel comprising the intact sensor or, respectively, the intact sensor signal path runs stably and takes care of the vehicle's driving stability.

Moreover, when in response to a defect at the sensor of the rear wheel, switch-over to the sensor signal of the front wheel on the same side is performed. This has the advantage that when one road side is slippery or, respectively, during cornering, a sensor signal showing the right tendency will be evaluated because in this case different conditions, in respect of friction and brake slip control, prevail on the two vehicle sides, while like conditions prevail at the front and the rear wheel of the same side.

In accordance with the present invention, closing of the defective sensor signal path and the switching-over to another control channel according to the predetermined selection criterion preferably will be maintained only as long as the sensor error exists. Upon completion of the braking action with slip control, the control unit will be de-activated, and the error will be signaled. Besides, it is possible to initiate the switching-over and/or the switching-back with delay or in dependence upon the duration of the signal failure or the signal interference.

What is claimed is:

1. A circuit configuration for a slip-controlled vehicle brake system which is equipped with sensors for the determination of the rotational behavior of the front and the rear wheels, with electronic circuits for the processing, logic combining and monitoring of the sensor signals and for the generation of control signals, which control signals allow control the braking pressure variation individually at the wheels according to the predetermined selection criteria, wherein upon interference of the sensor signals of at least one of the wheels (VR, VL, HR, HL), the braking pressure control of this wheel is switched over the being response to the rotational behavior of another wheel according to a predetermined selection criterion, wherein upon interference of the sensor signals of a front wheel (VR or VL), the braking pressure control of this wheel is switched over to being responsive to the rotational behavior of the second front wheel (VR or VL), while upon interference of the sensor signal of a rear wheel (HR, HL) the braking pressure control of this wheel can be switched over to being responsive to the rotational behavior of the front wheel (VR, VL) on the same side.

2. A circuit configuration as claimed in claim 1, wherein the switching-over is limited to the duration of the signal interference.

3. A circuit configuration as claimed in claim 1, wherein the switching-over is independent of the duration of the signal interference and is maintained until completion of the braking action.

* * * * *